US008074844B2

(12) United States Patent
Ophardt et al.

(10) Patent No.: US 8,074,844 B2
(45) Date of Patent: Dec. 13, 2011

(54) PISTON PUMP STROKE ADJUSTMENT MECHANISM

(75) Inventors: Heiner Ophardt, Vineland (CA); Martin Anhuf, Kamp-Lintfort (DE)

(73) Assignee: Gotohti.Com Inc., Ontario (CA)

( * ) Notice: Subject to any disclaimer, the term of this patent is extended or adjusted under 35 U.S.C. 154(b) by 1049 days.

(21) Appl. No.: 11/979,364

(22) Filed: Nov. 1, 2007

(65) Prior Publication Data

US 2008/0121663 A1 May 29, 2008

(30) Foreign Application Priority Data

Nov. 8, 2006 (CA) ...................................... 2567378

(51) Int. Cl.
*G01F 11/06* (2006.01)

(52) U.S. Cl. ...................................... 222/309; 222/321.9

(58) Field of Classification Search ............. 222/153.13, 222/250, 287, 309, 321.9; 422/925
See application file for complete search history.

(56) References Cited

U.S. PATENT DOCUMENTS

| | | | | | |
|---|---|---|---|---|---|
| 831,758 | A | * | 9/1906 | Yanacopoulo | 222/309 |
| 853,670 | A | * | 5/1907 | Yanacopoulo | 222/309 |
| 2,096,227 | A | * | 10/1937 | De Weal | 222/153.13 |
| 2,521,433 | A | * | 9/1950 | White | 222/131 |
| 3,148,806 | A | * | 9/1964 | Meshberg | 222/402.11 |
| 3,567,081 | A | * | 3/1971 | Meshberg | 222/402.17 |
| 3,758,005 | A | * | 9/1973 | Christine et al. | 222/309 |
| 5,253,788 | A | | 10/1993 | Vandromme et al. | |
| 6,105,826 | A | * | 8/2000 | Oursin et al. | 222/153.06 |
| 6,109,547 | A | * | 8/2000 | Ritsche | 239/337 |
| 6,135,325 | A | * | 10/2000 | Fessel et al. | 222/309 |
| 6,427,876 | B1 | * | 8/2002 | Fuchs | 222/321.2 |

FOREIGN PATENT DOCUMENTS

| | | |
|---|---|---|
| DE | 199 53 838 | 10/2001 |
| EP | 1 460 001 | 9/2004 |

* cited by examiner

*Primary Examiner* — Kevin P Shaver
*Assistant Examiner* — Daniel R Shearer
(74) *Attorney, Agent, or Firm* — Thorpe North & Western LLP

(57) ABSTRACT

A piston pump with a piston coaxially slidable in a chamber for dispensing fluid out of a discharge tube which extends normal to the axis about which the piston is slidable in the chamber with a stroke stop member rotatably journalled on the discharge tube for pivoting between different positions in which the stroke stop member limits inward sliding of the piston into the chamber to different extents.

19 Claims, 7 Drawing Sheets

PISTON PUMP STROKE ADJUSTMENT MECHANISM

SCOPE OF THE INVENTION

This invention relates to a stroke adjustment mechanism for a piston pump and, more particularly, a stroke adjustment mechanism rotationally mounted about a discharge tube.

BACKGROUND OF THE INVENTION

Stroke adjustment mechanisms are known to adjust the stroke of a piston pump by limiting the distance a piston may be moved relative to a piston chamber. Known stroke adjustment mechanisms require a separately manufactured element for mounting on the piston chamber and resulting in difficulties in assembly and increased expense.

SUMMARY OF THE INVENTION

To at least partially overcome these disadvantages of previously known devices, the present invention provides a piston pump with a piston coaxially slidable in a chamber for dispensing fluid out of a discharge tube which extends normal to the axis about which the piston is slidable in the chamber with a stroke stop member rotatably journalled on the discharge tube for pivoting between different positions in which the stroke stop member limits inward sliding of the piston into the chamber to different extents.

In one aspect, the present invention provides a pump for dispensing fluids from a reservoir comprising:

a piston-chamber forming member having a cylindrical chamber about a central axis, said chamber having a chamber wall, an inner end in fluid communication with the reservoir and an outer open end, a piston forming element having a piston portion coaxially slidably received in the chamber with an outer portion of the piston forming element extending outwardly from the open end of the chamber, the outer portion including a hollow discharge tube extending generally radially outwardly from the central axis from an inlet end to a discharge outlet, the piston portion being generally cylindrical in cross-section with a central axially extending hollow stem having a central passageway with an inner end opening into the chamber and an outer end communicating with the inlet end of the hollow discharge tube, an axially outwardly directed stroke stop surface fixedly relative to the piston-chamber forming member, a stroke stop member carried on the discharge tube for engagement with the stroke stop surface to limit inward coaxial sliding of the piston forming element relative the piston-chamber forming member, the stroke stop member journalled on the discharge tube for pivoting about a radial axis extending radially from the central axis between a first rotational position and a second rotational position, in the first rotational position the stroke stop member engaging the stroke stop surface to limit inward coaxial sliding of the piston forming element relative the piston-chamber forming member at a first axial location, in the second rotational position the stroke stop member engaging the stroke stop surface to limit inward coaxial sliding of the piston forming element relative the piston-chamber forming member at a second axial location which is different than the first axial location, wherein reciprocal sliding of the piston forming element relative the piston-chamber forming member dispensing fluid from the reservoir out the discharge outlet.

BRIEF DESCRIPTION OF THE DRAWINGS

Further aspects and advantages of the present invention will become apparent from the following description taken together with the accompanying drawings in which.

DETAILED DESCRIPTION OF THE DRAWINGS

Figure 1:
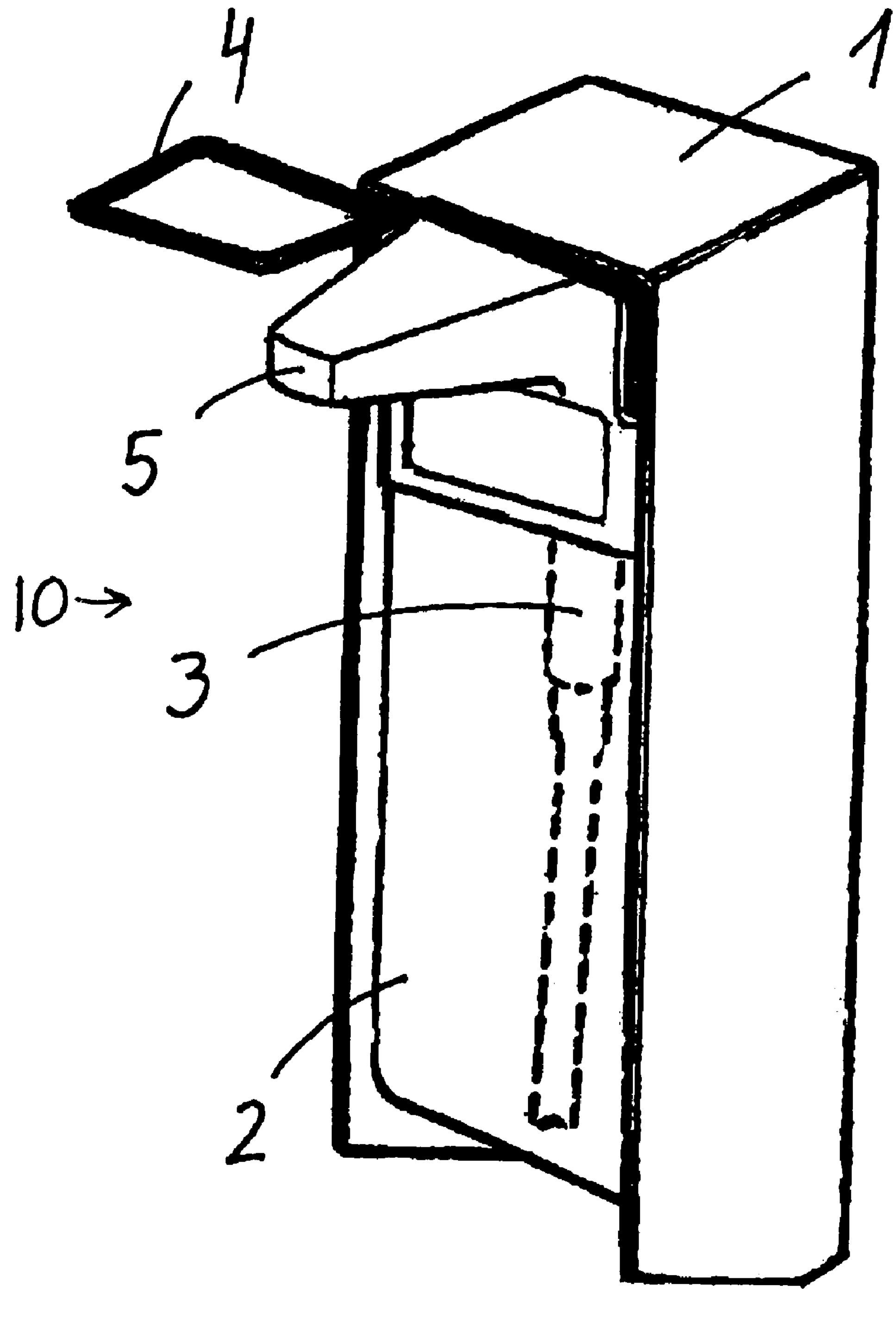
FIG. 1 shows a fluid dispenser in accordance with a first embodiment of the invention.
Figure 2:
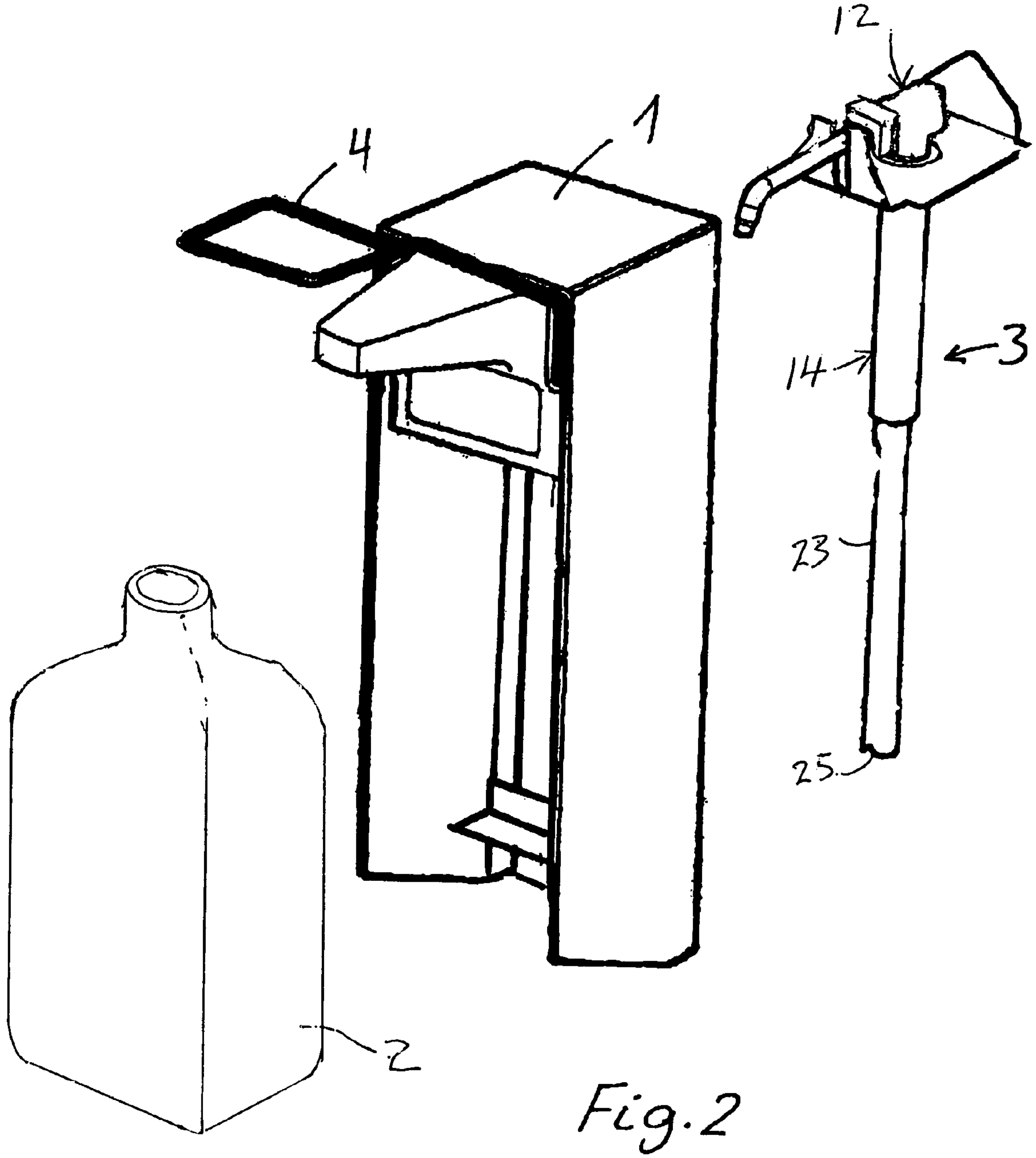
FIG. 2 is an exploded view of the dispenser of FIG. 1 showing the housing, the pump mechanism and the bottle.

FIGS. 1 and 2 show a fluid dispenser 10 in accordance with the present invention having a housing 1, a removable bottle 2 and a pump mechanism 3. The pump mechanism 3 includes a piston element 12 and a piston chamber forming member 14.

The piston chamber forming member 14 includes a cylindrical chamber tube 18 extending downwardly from an open upper end 19 to a lower end 20 about an axis 21 and defining a chamber 26 therein. A dip tube 23 extends downwardly from the lower end 20 of the chamber tube 18. The dip tube 23 extends downwardly to an inlet 25 within the bottle 2. The piston chamber forming member 14 includes a support flange 17 which extends radially outwardly about the open upper end 19 of the chamber tube 18. At a forward end, the support flange 17 is bent to extend upwardly as a front wall 22.

The piston element 12 has a vertical stem portion coaxially received within the cylindrical chamber 26 of the piston chamber forming member 14 thus forming with the chamber tube 18 a piston pump arrangement for dispensing fluid from the chamber 26 outwardly through a discharge tube 27. Reciprocal sliding of the piston element 12 within the piston chamber forming member 14 about a central axis 21 draws fluid in the bottle 2 upwardly through the dip tube 16 into the piston chamber forming member 14 from which it is dispensed out an outlet 33 of the dispensing tube 27 forming part of the piston element 12.

Figures 3, 4:
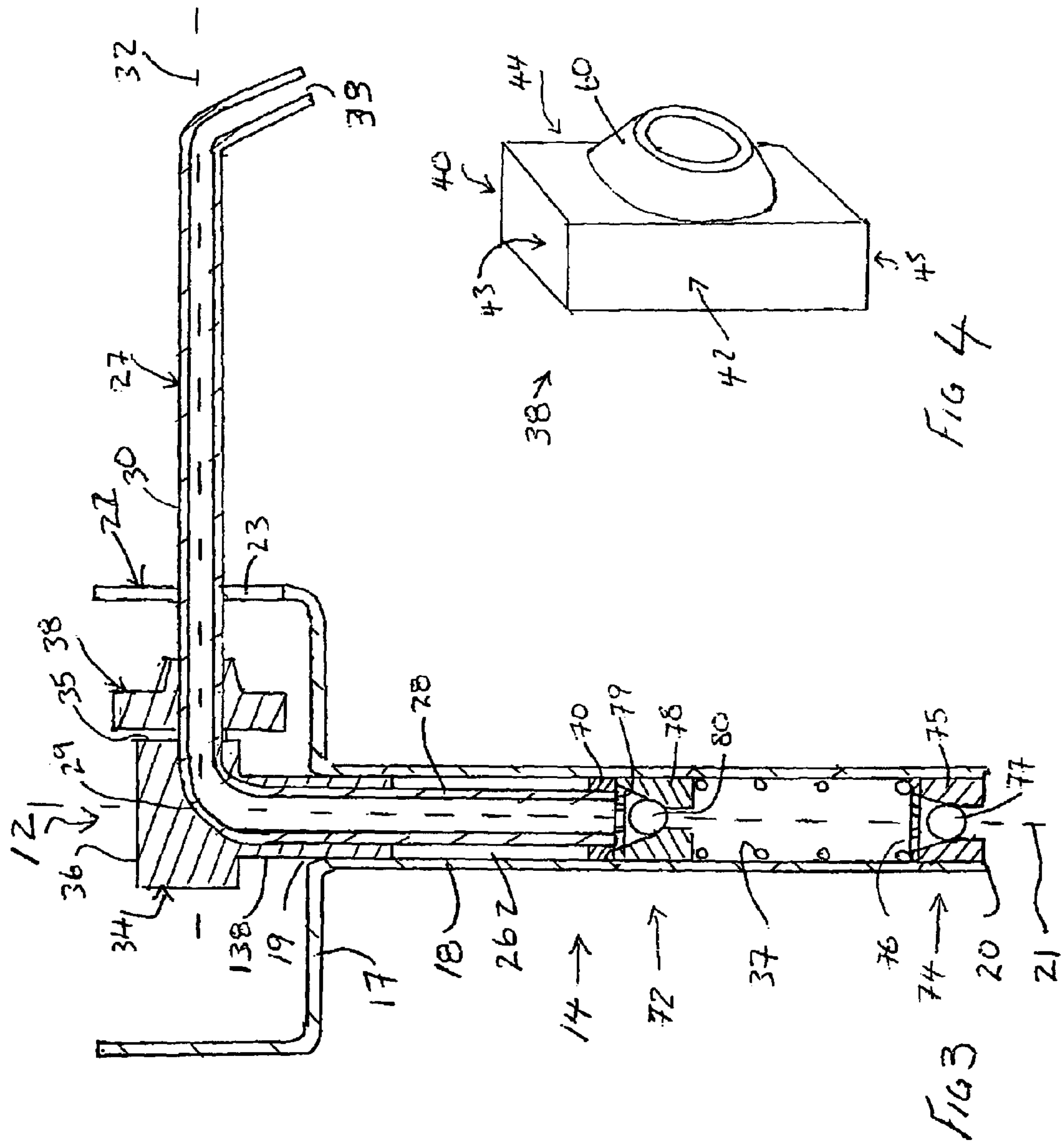
FIG. 3 is a schematic cross-sectional side view of the pump mechanism with the stroke stop member in a first position.
FIG. 4 is a pictorial view of the stroke stop member.

As seen in FIG. 3, the discharge tube 27 is a continuous tube, preferably of metal, which has a vertical portion 28 coaxial about the center axis 21. The discharge tube is bent 90 degrees in a curved portion 29 to extend normal the central axis as a horizontal portion 30 about a radial axis 32. The horizontal portion 30 merges into a downwardly directed nozzle outlet 33. The front wall 22 of the support flange 17 carries a vertical slotway 23 open at an upper end within which slotway 23 the forwardly extending horizontal portion 30 of the discharge tube 27 is disposed to locate the piston member 12 against rotation about the center axis 21 relative to the piston chamber forming member 14.

A plastic casing or locating member 34 disposed about the tube 27 to provide, amongst other things, engagement surfaces 36 for engagement by the lever 4 such that manual downward pivoting of the lever 4 will urge the piston element 12 downwardly into the piston chamber forming member 14 against the bias of a spring 37. The locating member 34 also provides cylindrically disposed guide surfaces 138 disposed coaxially about the vertical portion 28 of the tube to guide the piston element 12 coaxially about the center axis 21 in the chamber 26. The plastic casing 34 encases the curved portion 29 of the tube 27 and has a forward end 35 disposed about the horizontal portion 30 of the tube 27. Forwardly of the forward end 35 of the casing 34, a stroke stop member 38 is provided about the horizontal portion 30 of the tube 27.

Figure 7:
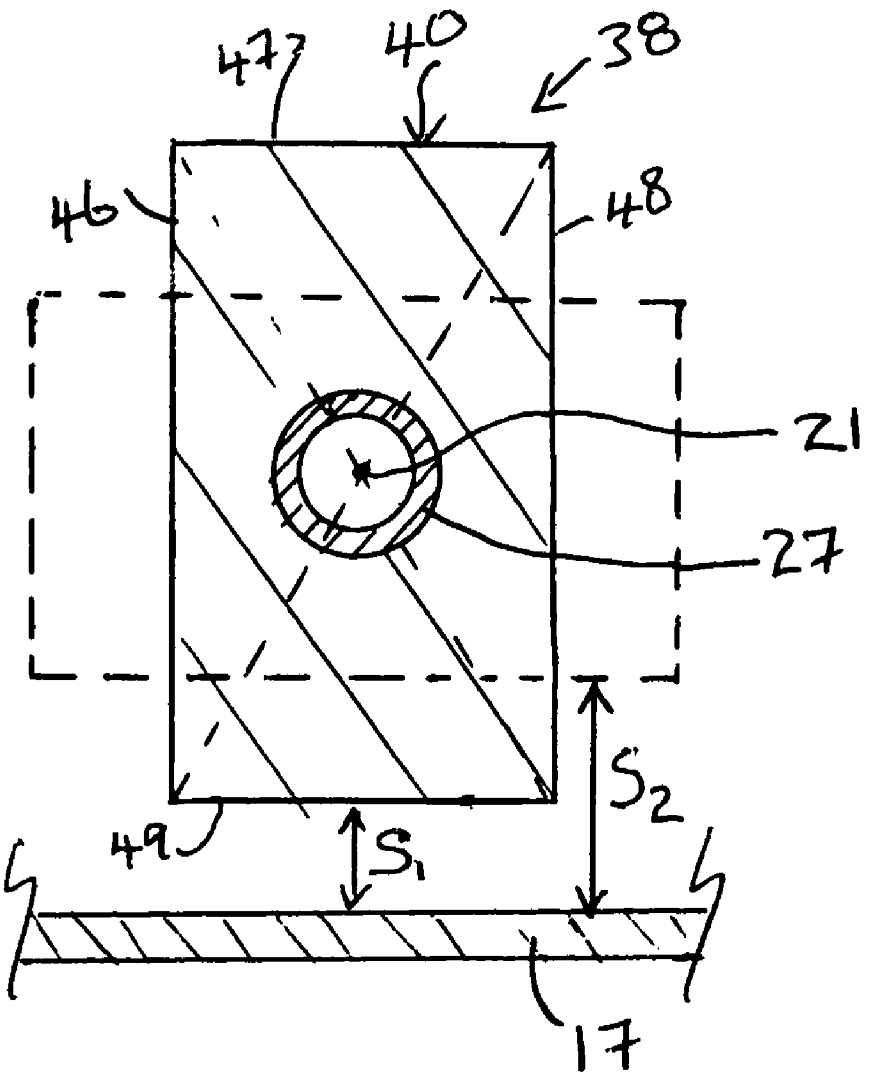
FIG. 7 is a cross-sectional view along section line 7-7' in FIG. 5.

The stroke stop member 38 is engaged on the tube 27 rotatably journalled about the tube 27. The stroke stop member 38 has a box-like rectangular section 40 with two longer end surfaces 42 and 44 adjacent its longer sides 46 and 48 and two shorter end surfaces 43 and 45 adjacent its shorter sides 47 and 49. As shown in FIG. 7, diagonals of the rectangular section intersect at the central axis 21 through the tube 27. The stroke stop member 38 includes a frustoconical hub section 60 which extends forwardly to increase the area over which the stroke stop member 38 is journalled to the tube 27.

Figure 5:
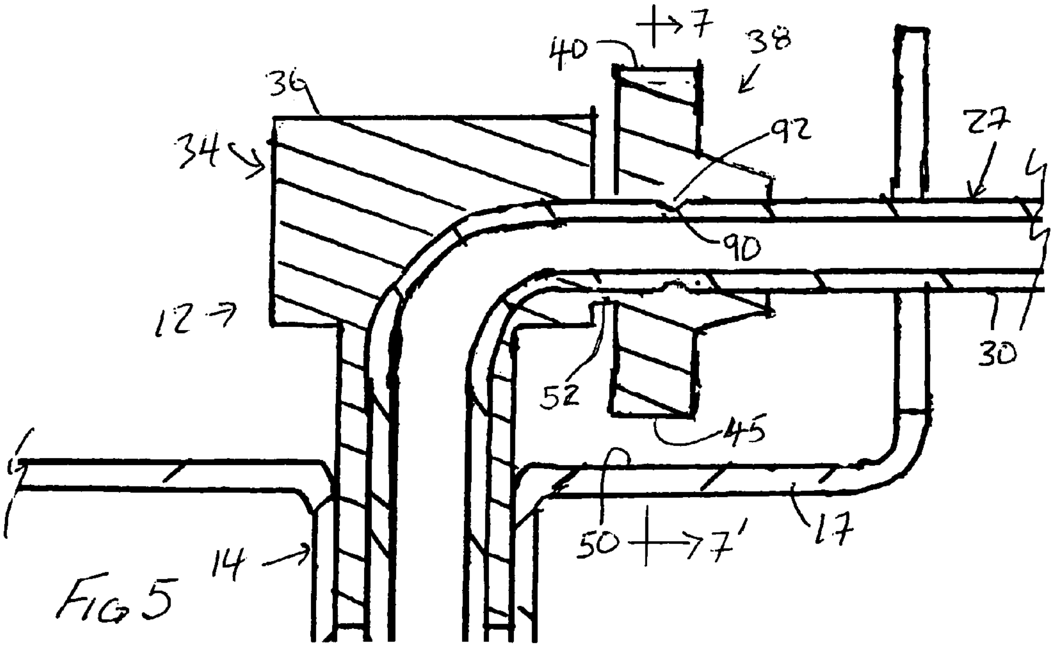
FIG. 5 is an enlarged view of FIG. 3.

FIG. 5 shows a first rotational orientation of the stroke stop member 38 in which the stroke stop member 38 is in a first rotational position relative to the tube 27 such that the rectangular section 40 is disposed with its longer sides 46 and 48 vertical such that its end surface 45 is disposed to be horizontal and in opposition to an upper stop surface 50 of a horizontal flange 17 of the piston chamber forming member 14.

Engagement between the stroke stop member 38 and the upper surface 50 of the support flange 17 limits the extent to which the piston element 12 may be moved downwardly, thus limiting the stroke of the piston element 12 and, therefore, the amount of fluid which can be discharged in a single stroke of the piston element 12 from an extended position and a retracted position limited by the stroke stop member 38 and then returning to the extended position as under the bias of the spring member 37.

Figure 6:
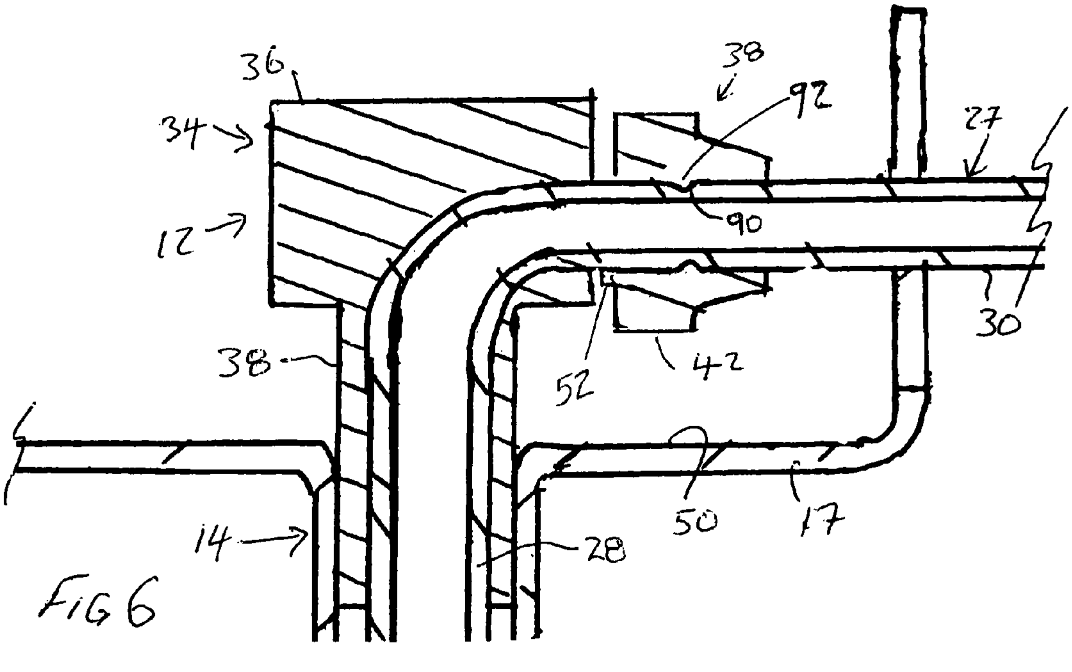
FIG. 6 is a side view the same as in FIG. 5, however, with the stroke stop member in a second position.

FIG. 6 shows a second rotational orientation in which the stroke stop member 38 is in a second rotational position relative to the discharge tube 27 such that the rectangular section 40 is disposed with its shorter sides 47 and 49 vertical such that end surface 42 is disposed to be horizontal and in opposition to the upper stop surface 50 of the horizontal flange 17 of the piston chamber forming member 14. In FIG. 6, the stroke of the piston element 12 will be longer than in the case of FIG. 5 with a greater amount of fluid to be discharged in a single stroke.

The stroke stop member 38 is provided to be manually accessible and capable of being manually rotated between the first rotational position of FIG. 5 and the second rotational position of FIG. 6. The stroke stop member 38 preferably frictionally engages the discharge tube 27 to permit manual rotation yet once moved to either the first orientation or the second orientation will maintain such orientation.

FIGS. 5 and 6 show the tube 27 as having an annular groove 90 serving to locate the stroke stop member 38 axially on the horizontal portion 30 of the tube against movement axially. A rib 92 carried on the stroke stop member 38 is received within the groove 90. Such an arrangement to prevent axial movement is not necessary, however, if desired, may be provided by other arrangements.

Reference is made to FIG. 7 which is a schematic cross-sectional view along section line 7-7' in FIG. 5 showing the location of the tube 27 and the rectangular section 40 of the stroke stop member 38 in a fully extended position of the piston element 12 as seen in solid lines. The arrow S1 indicates the stroke distance that the piston element 12 may move in the first orientation of FIG. 5. FIG. 7 shows in dashed lines the relative location of the rectangular section 40 of the stroke stop member when in the second orientation of FIG. 6 with arrow S2 showing the stroke distance for the second orientation of FIG. 6.

Providing the stroke stop member 38 with the rectangular portion 40, as shown in FIGS. 1 to 7, is a preferred configuration such that for use, it needs only to be manually rotated 90 degrees in either direction so as to move from the first orientation to the second orientation and provide for two different strokes. However, it is to be appreciated that the stroke stop member 38 may be provided to have a number of different faces and, therefore, provide a number of different stroke distances.

Figure 8:
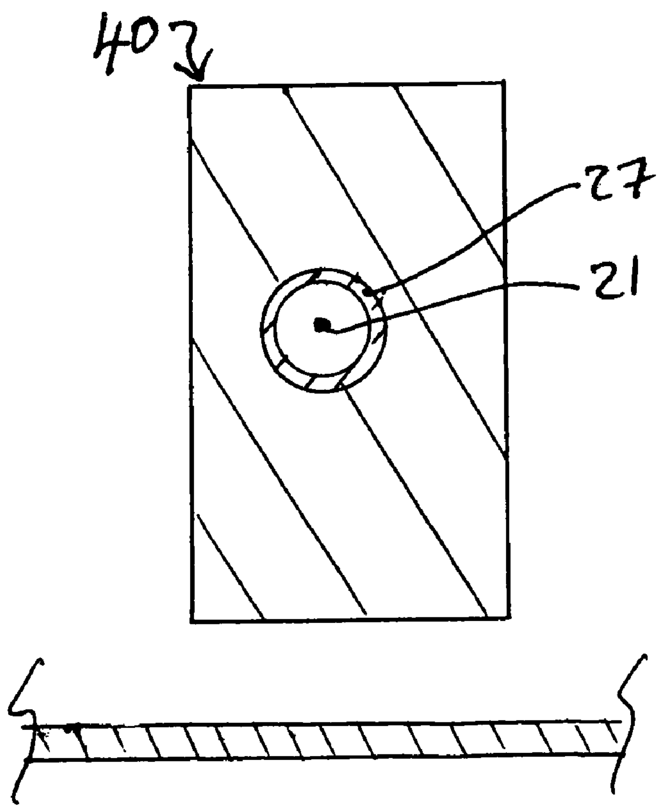
FIG. 8 is a view similar to FIG. 7 but of a different, rectangular stroke stop member.

FIG. 8 shows a schematic cross-sectional view similar to FIG. 7 but showing the rectangular section 40 arranged such that each side is a different distance from the center axis 21 thus providing four different stroke distances depending upon which side is disposed to be horizontal in opposition to the support flange 17.

Figure 9:
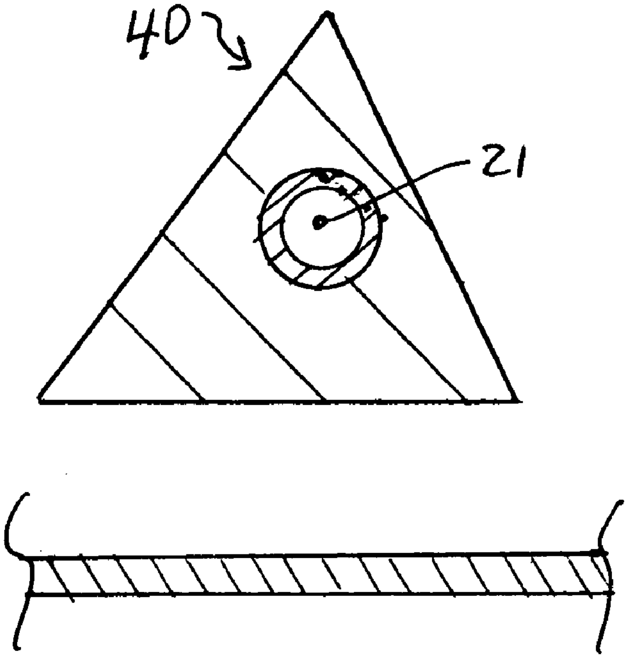
FIG. 9 is a view similar to FIG. 7 but of a triangular stroke stop member.

Reference is made to FIG. 9 which is a schematic cross-sectional view similar to that in FIG. 7 but in which the stroke stop member 38 having a triangular portion 40 in cross-section, with each face of the polygon located perpendicular to a radius through the center axis 21 and each face located at a different distance from the center axis 21 providing for three different stroke distances. Other polygonal shapes may be provided such as five-sided and six-sided to provide, for example, up to five and six different stroke distances.

In the embodiments illustrated in FIGS. 1 to 7, the stroke stop member 38 and the casing member 34 may be injection molded in place on the metal tube 27. While each of the stroke stop member 38 and the casing member 34 may be injection molded in place about the tube 27 as separate elements as with each having a separate melt inlet nozzle, it is preferred that they be injection molded from a single plastic melt nozzle and be connected by a frangible connection tube or runner 52 which can, for example, advantageously extend axially adjacent the horizontal portion 30 of the tube 27 from the casing member 34 to the stroke stop member 38. In FIG. 5, the frangible runner 52 is shown extending between the casing member 34 and the stroke stop member 38 along an under surface of the horizontal portion 30 of the discharge tube 27. In FIG. 5, the flexible runner 52 is intact. As seen in FIG. 6, after manual rotation of the stroke stop member 38 relative to the casing member 34, the frangible runner 52 is broken and a portion of the frangible runner 52 is shown as connected to the casing member 34. Towards assisting in providing the frangible runner 52, the horizontal portion 30 of the discharge tube 27 may be provided to not be precisely circular in cross-section such as may arise as a result of bending of the metal tube 27. The non-circularity of the tube 27 may, when provided in a mold cavity having a general circular opening about the tube 27, provide for the runway 52 adjacent the tube 27.

Figure 10:
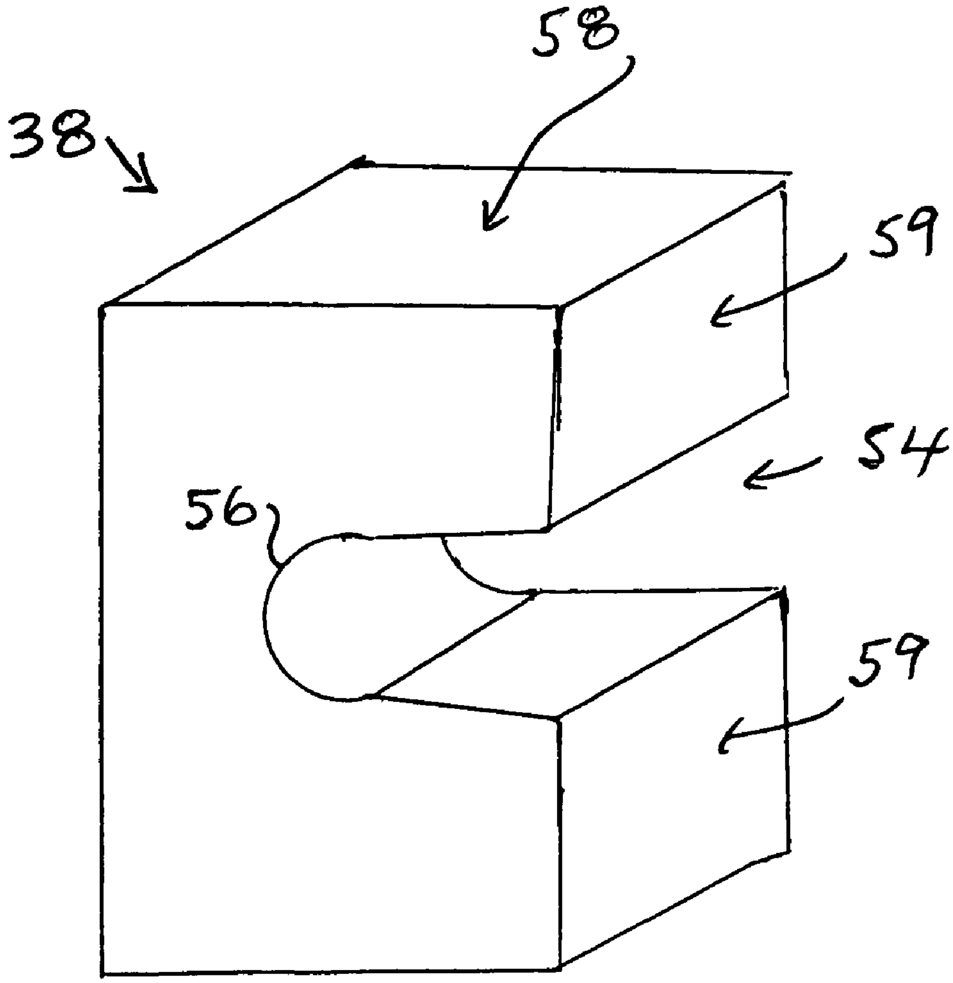
FIG. 10 is a perspective view of another embodiment of a stroke stop member.

Reference is made to FIG. 10 which illustrates another embodiment in accordance with the present invention in which the stroke stop member 38 comprises a separately formed removable element for use on a piston element 12 the same as shown in FIGS. 1 to 7 but with the stop stroke member shown in those figures to not be provided and the removable stroke stop member 38 of FIG. 10 to be used. As shown, the stroke stop member 38 in FIG. 10 has a slot 54 extending inwardly from one side surface and opening into a part cylindrical, slightly enlarged blind end 56 to the slot. The stroke stop member 38 may be applied to the horizontal portion 30 of the tube 27 with the tube to slide radially in the slot 54 and into a snap fit in the part cylindrical enlarged blind end 56. The stroke stop member 38 with the tube 27 received in the blind end 56 is manually rotatable about the tube 27 to different rotational positions in which end surfaces such as 58 and 59 on the stroke stop member 38 at different distances from the center axis 21 of the tube 27 are adapted to engage the support flange 17 of the piston chamber forming element 14 to limit the stroke of the piston element 12.

Referring to FIG. 3, the piston element 12 fixedly carries about the inner end of the vertical portion 28 of the tube 27 an annular sealing member 70 which slidably sealingly engages the inner surface of the wall of the chamber 26 to prevent fluid flow therepast As seen in FIG. 3, the pump mechanism 10 has inward of the sealing member 70 an outer ball valve 72 and an inner ball valve 74 each providing for one way flow outwardly therepast but preventing flow inwardly therepast.

A ball valve seat member 75 of the inner ball valve 72 is fixedly secured in the inner end 20 of the chamber 26. A ball cage member 76 is engaged above, outwardly of the ball valve seat member 75, and serves to retain a ball 77 above the ball valve seat member 75 yet permits fluid flow centrally therethrough.

The helical coil spring 37 has an inner end engage the ball cage member 76 urging it outwardly into the ball valve seat member 75. An outer end of the spring 37 engages on a ball valve seat member 78 of the upper outer ball valve 70 resiliently resisting downward movement of the outer ball valve seat member 78. A ball cage member 79 is engaged above, outwardly of the ball valve seat member 78 and serves to retain a ball 80 above the ball valve seat member 78 yet permit fluid flow centrally therethrough.

Movement of the piston element 12 axially inwardly to a retracted position relative the piston chamber forming member 14 urges the sealing member 70 into the ball valve seat member 79 compressing the spring 37. On release of the piston element 12, the spring 37 biases the piston element 12 to return to an extended position. Reciprocal movement of the piston element 12 draws fluid through the inner end 20 of the chamber 26 and dispenses it out the discharge outlet 33 of the tube 27.

The preferred embodiments illustrated show the support flange 17 on the piston chamber forming element serving as a stop surface for the engagement by surfaces of the stroke stop member 38. Other structures could be provided as the stop surface which is fixed relative to the piston chamber forming element 14.

The preferred embodiments show use of the metal tube 27 as part of the piston element 12. Use of a such a metal tube 27 is not necessary and a discharge tube with a horizontal portion for passage of fluid therethrough can be provided, as of plastic material, to have an outer journaling surface of circular cross-section upon which a removable plastic stroke stop member 38 may be secured for relative rotation.

The invention has been described with reference to preferred embodiments. Many modifications and variations will now occur to a person skilled in the art. For a definition of the invention, reference is made to following claims.

We claim:

1. A pump for dispensing fluids from a reservoir comprising:

a piston-chamber forming member having a cylindrical chamber about a central axis, said chamber having a chamber wall, an inner end in fluid communication with the reservoir and an outer open end, a piston forming element having a piston portion coaxially slidably received in the chamber with an outer portion of the piston forming element extending outwardly from the open end of the chamber, the outer portion including a hollow discharge tube extending generally radially outwardly from the central axis from an inlet end to a discharge outlet, the piston portion being generally, cylindrical in cross-section with a central axially extending hollow stem having a central passageway with an inner end opening into the chamber and an outer end communicating with the inlet end of the hollow discharge tube, an axially outwardly directed stroke stop surface fixedly relative to the piston-chamber forming member, a stroke stop member carried on the discharge tube for engagement with the stroke stop surface to limit inward coaxial sliding of the piston forming element relative the piston-chamber forming member, the stroke stop member journalled on the discharge tube for pivoting about a radial axis extending radially from the central axis between a first rotational position and a second rotational position, in the first rotational position the stroke stop member engaging the stroke stop surface to limit inward coaxial sliding of the piston forming element relative the piston-chamber forming member at a first axial location, in the second rotational position the stroke stop member engaging the stroke stop surface to limit inward coaxial sliding of the piston forming element relative the piston-chamber forming member at a second axial location which is different than the first axial location, wherein reciprocal sliding of the piston forming element relative the piston-chamber forming member dispensing fluid from the reservoir out the discharge outlet the radial axis is normal to the central axis, the discharge tube has an outer surface cylindrical about the radial axis, the stroke stop member having a bore therethrough to receive the discharge tube coaxially therein, and the bore having journalling surfaces engaging said outer surface of the discharge tube at least over 180 degrees about the radial axis.

2. A pump as claimed in claim 1 wherein the discharge tube comprises a generally cylindrical metal tube.

3. A pump as claimed in claim 1 including:

an inlet one-way valve between the reservoir and the chamber permitting fluid flow through the inner end of said chamber only from the reservoir to the chamber;

an outlet one-way valve between the chamber and the inlet end of the passageway permitting fluid flow through the inlet end of the passageway only from the chamber into the passageway, a circular sealing disc extending radially outwardly from the stem, the sealing disc engaging the chamber wall circumferentially thereabout to form a substantially fluid impermeable seal therewith on sliding of said piston forming element inwardly and outwardly, wherein in operation, (i) on the piston forming element sliding outwardly in said chamber fluid a vacuum is created in the chamber which closes the outlet one-way valve and that fluid is drawn into the chamber from the reservoir past the inlet one-way valve, and (ii) on the piston forming element sliding inwardly into the chamber, a pressure is created in the chamber which closes the inlet one-way valve and fluid is discharged from the chamber past the outlet one-way valve into the inlet end of the passageway and out the outlet end of the passageway.

4. A pump as claimed in claim 1 including a hollow dip tube having an outer end coupled to the inner end of the chamber and an inner end spaced therefrom in communication with fluid in the reservoir.

5. A pump for dispensing fluids from a reservoir comprising:

a piston-chamber forming member having a cylindrical chamber about a central axis, said chamber having a chamber wall, an inner end in fluid communication with the reservoir and an outer open end, a piston forming element having a piston portion coaxially slidably received in the chamber with an outer portion of the piston forming element extending outwardly from the open end of the chamber, the outer portion including a hollow discharge tube extending generally radially outwardly from the central axis from an inlet end to a discharge outlet, the piston portion being generally cylindrical in cross-section with a central axially extending hollow stem having a central passageway with an inner end opening into the chamber and an outer end communicating with the inlet end of the hollow discharge tube, an axially outwardly directed stroke stop surface fixedly relative to the piston-chamber forming member, a stroke stop member carried on the discharge tube for engagement with the stroke stop surface to limit inward coaxial sliding of the piston forming element relative the piston-chamber forming member, the stroke stop member journalled on the discharge tube for pivoting about a radial axis extending radially from the central axis between a first rotational position and a second rotational position, in the first rotational position the stroke stop member engaging the stroke stop surface to limit inward coaxial sliding of the piston forming element relative the piston-chamber forming member at a first axial location, in the second rotational position the stroke stop member engaging the stroke stop surface to limit inward coaxial sliding of the piston forming element relative the piston-chamber forming member at a second axial location which is different than the first axial location, wherein reciprocal sliding of the piston forming element relative the piston-chamber forming member dispensing fluid from the reservoir out the discharge outlet, and including a generally cylindrical metal tube forming the discharge tube and providing the passageway therein, the metal tube bent so as to form an extension of the discharge tube extending continuously inwardly from the outer portion along the central axis centrally through the piston portion.

6. A pump as claimed in claim 5 wherein the piston element includes a locating member engaged within the outer open end of the chamber to assist in coaxially locating the outer portion coaxially of the central axis.

7. A pump as claimed in claim 6 wherein the locating member is formed of plastic by injection molding about the metal tube.

8. A pump as claimed in claim 6 wherein the locating member and the stroke stop member are formed of plastic by simultaneous injection molding about the metal tube.

9. A pump as claimed in claim 6 wherein the locating member and the stroke stop member are formed of plastic by injection molding about the metal tube as the same member with an element formed therebetween for passage of plastic melt during molding between the locating member and the stroke stop, the element being frangible on manual rotation of the stroke stop member about the radial axis relative the locating member.

10. A pump as claimed in claim 9 wherein the locating member and the stroke stop member when injection molded are in the first rotational position, and manual rotation of the locating member relative the stroke stop member to the second rotational position severs the frangible element.

11. A pump as claimed in claim 5, the radial axis is normal to the central axis.

12. A pump as claimed in claim 11 wherein the discharge tube has an outer surface cylindrical about the radial axis, the stroke stop member having a bore therethrough to receive the discharge tube coaxially therein, the bore having journalling surfaces engaging said outer surface of the discharge tube at least over 180 degrees about the radial axis.

13. A pump for dispensing fluids from a reservoir comprising:

a piston-chamber forming member having a cylindrical chamber about a central axis, said chamber having a chamber wall, an inner end in fluid communication with the reservoir and an outer open end, a piston forming element having a piston portion coaxially slidably received in the chamber with an outer portion of the piston forming element extending outwardly from the open end of the chamber, the outer portion including a hollow discharge tube extending generally radially outwardly from the central axis from an inlet end to a discharge outlet, the piston portion being generally cylindrical in cross-section with a central axially extending hollow stem having a central passageway with an inner end opening into the chamber and an outer end communicating with the inlet end of the hollow discharge tube, an axially outwardly directed stroke stop surface fixedly relative to the piston-chamber forming member, a stroke stop member carried on the discharge tube for engagement with the stroke stop surface to limit inward coaxial sliding of the piston forming element relative the piston-chamber forming member, the stroke stop member journalled on the discharge tube for pivoting about a radial axis extending radially from the central axis between a first rotational osition and a second rotational position, in the first rotational position the stroke stop member engaging the stroke stop surface to limit inward coaxial sliding of the piston forming element relative the piston-chamber forming member at a first axial location, in the second rotational position the stroke stop member engaging the stroke stop surface to limit inward coaxial sliding of the piston forming element relative the piston-chamber forming member at a second axial location which is different than the first axial location, wherein reciprocal sliding of the piston forming element relative the piston-chamber forming member dispensing fluid from the reservoir out the discharge outlet, and wherein the stroke stop member is formed separately from the a piston forming element and is removable and separable therefrom, the stroke stop member having a slotway extending radially of the radial axis from the bore to an entry opening in a side of the stroke stop member, the slotway permitting entry of the discharge tube through the entry opening via the slotway into the bore.

14. A pump as claimed in claim 13, the radial axis is normal to the central axis.

15. A pump as claimed in claim 14 wherein the discharge tube has an outer surface cylindrical about the radial axis, the stroke stop member having a bore therethrough to receive the discharge tube coaxially therein, the bore having journalling surfaces engaging said outer surface of the discharge tube at least over 180 degrees about the radial axis.

16. A pump for dispensing fluids from a reservoir comprising:

a piston-chamber forming member having a cylindrical chamber about a central axis, said chamber having a chamber wall, an inner end in fluid communication with the reservoir and an outer open end, a piston forming element having a pistonportion coaxially slidably received in the chamber with an outer portion of the piston forming element extending outwardly from the open end of the chamber, the outer portion including a hollow discharge tube extending generally radially outwardly from the central axis from an inlet end to a discharge outlet, the piston portion being generally cylindrical in cross-section with a central axially extending hollow stem having a central passageway with an inner end opening into the chamber and an outer end communicating with the inlet end of the hollow discharge tube, an axially outwardly directed stroke stop surface fixedly relative to the piston-chamber forming member, a stroke stop member carried on the discharge tube for engagement with the stroke stop surface to limit inward coaxial sliding of the piston forming element relative the piston-chamber forming member, the stroke stop member journalled on the discharge tube for pivoting about a radial axis extending radially from the central axis between a first rotational position and a second rotational position, in the first rotational position the stroke stop member engaging the stroke stop surface to limit inward coaxial sliding of the piston forming element relative the piston-chamber forming member at a first axial location, in the second rotational position the stroke stop member engaging the stroke stop surface to limit inward coaxial sliding of the piston forming element relative the piston-chamber forming member at a second axial location which is different than the first axial location, wherein reciprocal sliding of the piston forming element relative the piston-chamber forming member dispensing fluid from the reservoir out the discharge outlet, and wherein the stroke stop member is rectangular in cross-section normal to the radial axis, the two surfaces along the short sides of the rectangle forming first engagement surfaces equidistant from the radial axis and one of which engages in the first rotational position with stroke stop surface to limit inward coaxial sliding of the piston forming element and, the two surfaces along the long sides of the rectangle forming second engagement surfaces equidistant from the radial axis and one of which engages in the second rotational position with stroke stop surface to limit inward coaxial sliding of the piston forming element.

17. A pump as claimed in claim 16, the radial axis is normal to the central axis.

18. A pump as claimed in claim 17 wherein the discharge tube has an outer surface cylindrical about the radial axis, the stroke stop member having a bore therethrough to receive the discharge tube coaxially therein, the bore having journalling surfaces engaging said outer surface of the discharge tube at least over 180 degrees about the radial axis.

19. A pump for dispensing fluids from a reservoir comprising:

a piston-chamber forming member having a cylindrical chamber about a central axis, said chamber having a chamber wall, an inner end in fluid communication with the reservoir and an outer open end, a piston forming element having a piston portion coaxially slidably received in the chamber with an outer portion of the piston forming element extending outwardly from the open end of the chamber, the outer portion including a hollow discharge tube extending generally radially outwardly from the central axis from an inlet end to a discharge outlet, the piston portion being generally cylindrical in cross-section with a central axially extending hollow stem having a central passageway with an inner end opening into the chamber and an outer end communicating with the inlet end of the hollow discharge tube, an axially outwardly directed stroke stop surface fixedly relative to the piston-chamber forming member, a stroke stop member carried on the discharge tube for engagement with the stroke stop surface to limit inward coaxial sliding of the piston forming element relative the piston-chamber forming member, the stroke stop member joumalled on the discharge tube forpivoting about a radial axis extending radially from the central axis between a first rotational position and a second rotational position, in the first rotational position the stroke stop member engaging the stroke stop surface to limit inward coaxial sliding of the piston forming element relative the piston-chamber forming member at a first axial location, in the second rotational position the stroke stop member engagingthe stroke stop surface to limit inward coaxial sliding of the piston forming element relative the piston-chamber forming member at a second axial location which is different than the first axial location, wherein reciprocal sliding of the piston forming element relative the piston-chamber forming member dispensing fluid from the reservoir out the discharge outlet, and wherein the stroke stop member is rectangular in cross-section normal to the radial axis, the two surfaces along the short sides of the rectangle forming first and second engagement surfaces respectively at different distances from the radial axis, the two surfaces along the long sides of the rectangle forming third and fourth engagement surfaces respectively at different distances from the radial axis than each other and than the first and second engagement surfaces, the first engagement surface engages in the first rotational position with stroke stop surface to limit inward coaxial sliding of the piston forming element, the second engagement surface engages in the second rotational position with stroke stop surface to limit inward coaxial sliding of the piston forming element, the third engagement surface engages in a third rotational position with stroke stop surface to limit inward coaxial sliding of the piston forming element, the fourth engagement surfaces engages in a fourth rotational position with stroke stop surface to limit inward coaxial sliding of the piston forming element.

* * * * *